April 14, 1936.   N. T. BRANCHE   2,037,363
FUEL VALVE AND DAMPER CONTROL FOR FURNACES
Filed June 14, 1934   3 Sheets-Sheet 1
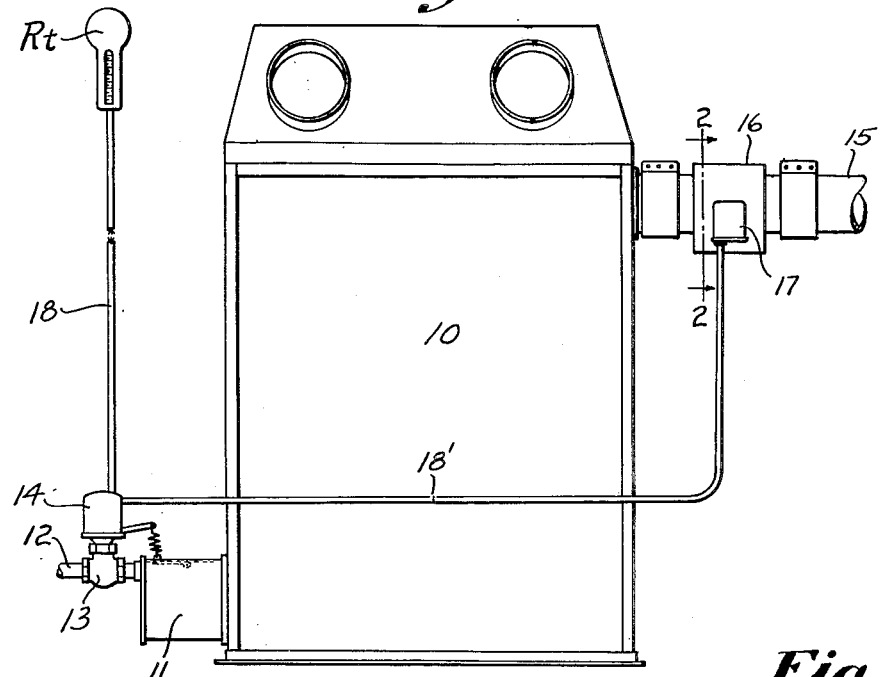
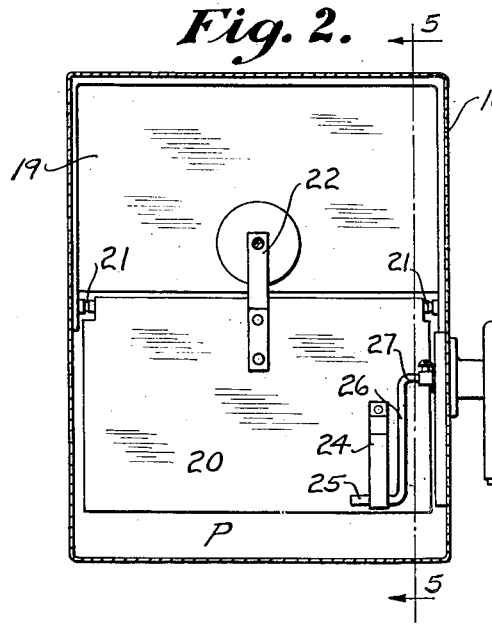
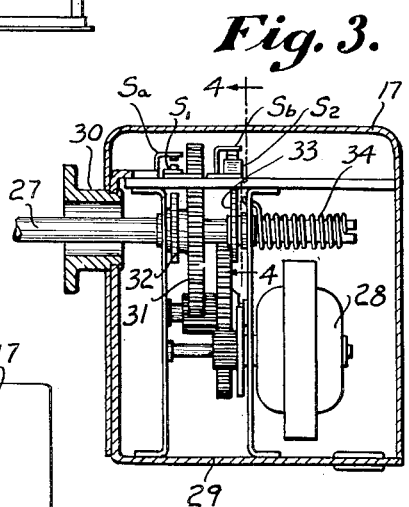
INVENTOR:
N. T. Branche
BY Charles A. Lind
ATTORNEY.

April 14, 1936.  N. T. BRANCHE  2,037,363
FUEL VALVE AND DAMPER CONTROL FOR FURNACES
Filed June 14, 1934   3 Sheets-Sheet 2
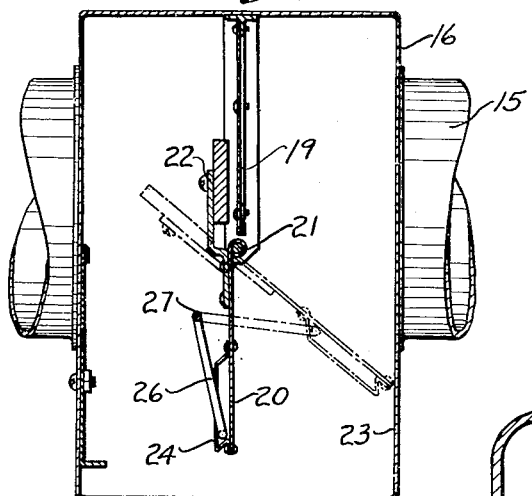
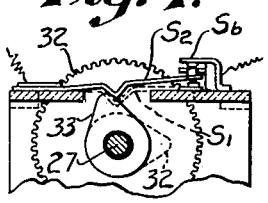
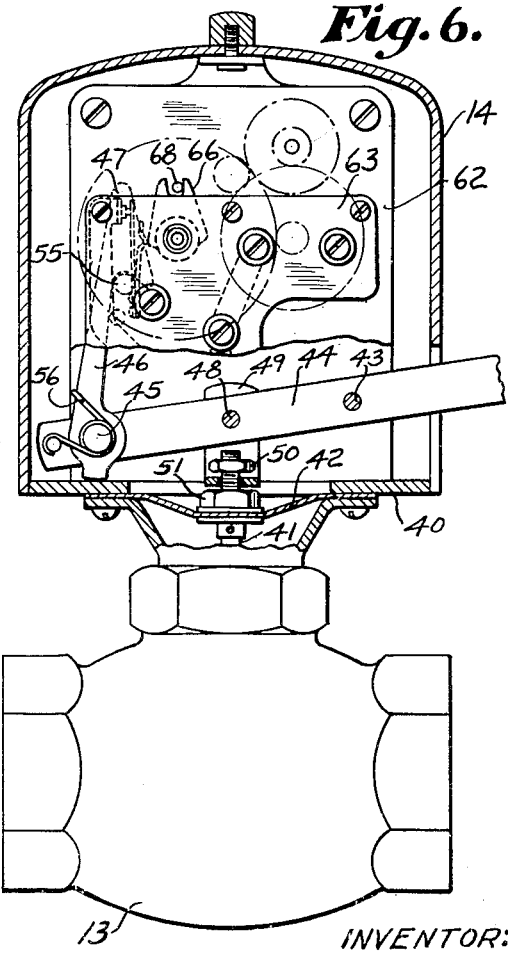
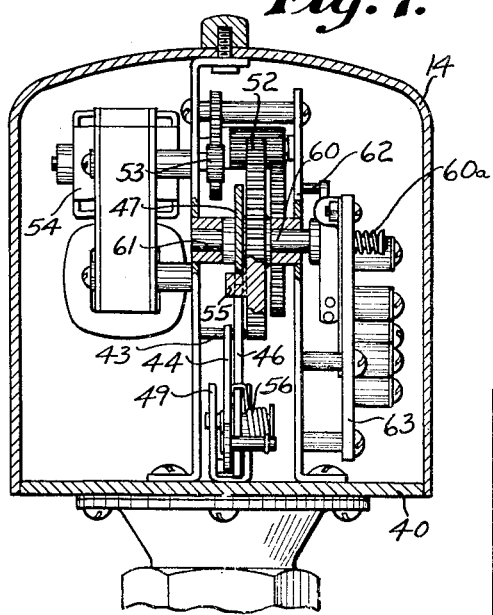
INVENTOR:
N. T. Branche
BY
Charles A. Lind
ATTORNEY.

INVENTOR:
N. T. Branche
BY
Charles A. Lind
ATTORNEY.

Patented Apr. 14, 1936

2,037,363

UNITED STATES PATENT OFFICE 2,037,363

FUEL VALVE AND DAMPER CONTROL
FOR FURNACES

Nelson T. Branche, Toledo, Ohio, assignor to
Surface Combustion Corporation, Toledo, Ohio,
a corporation of New York Application June 14, 1934, Serial No. 730,553

7 Claims. (Cl. 236—1)

This invention relates to control system for house heating furnaces which embody a damper in the exhaust flue and a motor operated fuel valve under the control of a room thermostat; and has for its general object to provide means for coordinating the operation of the fuel valve and damper in such a way that when the fuel valve is closed the exhaust damper will be closed and vice versa. The advantage of having the exhaust damper closed when the fuel valve is closed is that the escape of heat from the hot interior parts of the furnace to the exhaust flue or stack is materially reduced or effectually prevented. More particularly, it is an object of the invention to coordinate the operation of the fuel valve and exhaust damper in such a manner that when the room thermostat calls for heat the damper will be opened before the fuel valve is opened.

The invention has special utility in connection with gas fired furnaces but it may also be applied to oil fired furnaces.

Referring to the drawings wherein the preferred form of the invention is shown,—

Fig. 1 is a side elevation of a warm air furnace equipped with the present invention;

Fig. 2 is an enlarged section on line 2—2 in Fig. 1 of the flue damper and associated mechanism;

Fig. 3 is an enlarged sectional view of the motor operated mechanism for operating the damper;

Fig. 4 is a detail view on line 4—4 in Fig. 3;

Fig. 5 is a sectional view on line 5—5 in Fig. 2;

Fig. 6 is a vertical sectional view showing parts of the valve operating mechanism;

Fig. 7 is a cross sectional view of the mechanism shown in Fig. 6;

Figure 11:
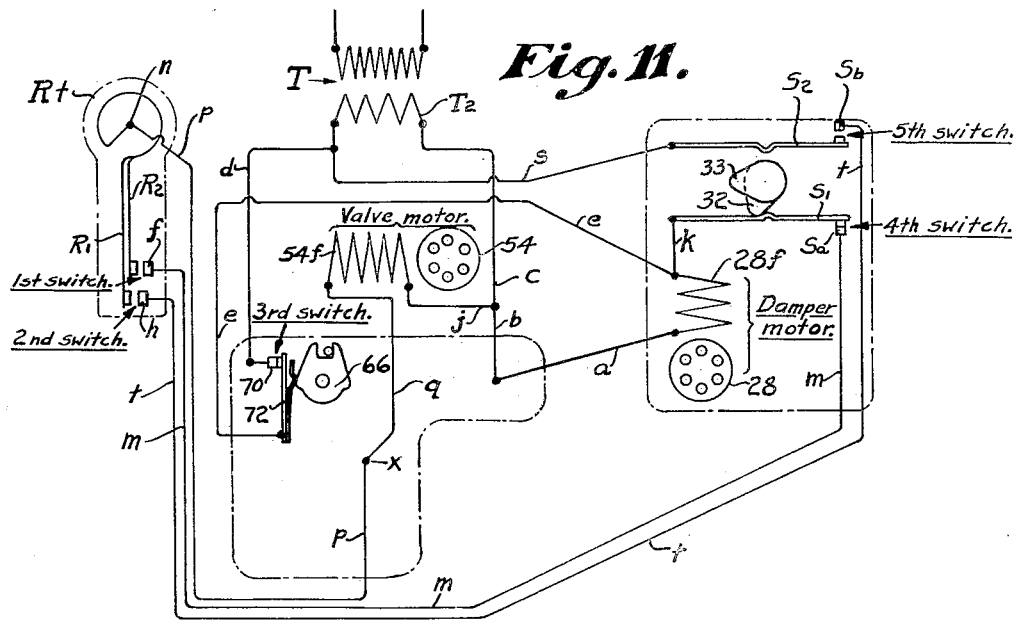
Fig. 11 is a diagrammatic representation of the electrical system for controlling the operation of the valve and damper operating mechanisms.
Figure 9:
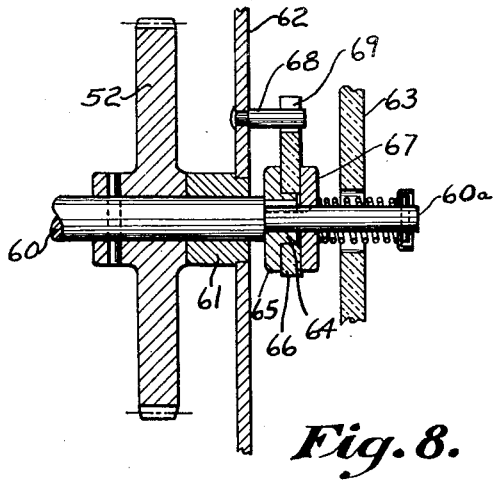
Figs. 8, 9 and 10 are fragmentary detail views of parts associated with the valve operating mechanism.

The furnace may be of any preferred type but is indicated as a warm air furnace 10. The burner for firing the furnace may also be of any preferred type but in the present instance is indicated as of a type having a portion 11 which extends outwardly from inside of the furnace, the fuel supply pipe being indicated at 12. Associated with the fuel pipe is a shut-off valve of any preferred type, the housing for which is indicated at 13, and associated with the valve is a motor mechanism the housing for which is indicated at 14. Leading from the furnace is an exhaust flue 15 which leads to a stack not shown, and associated with the flue is a damper box 16. Associated with the damper is a motor mechanism, the housing for which is indicated at 17. R*t* indicates a room thermostat and 18 and 18' the conduits for the wires of the various control circuits.

As shown in Figs. 2 and 5, the passage through the damper box is partially blocked off by a depending partition wall 19. The damper is indicated at 20 and is swingably supported at its upper edge by horizontal pivots 21. When the damper is open it hangs vertically and its lower edge is then above the bottom of the box a sufficient distance to form a passage P therebetween for the flow of products of combustion from the burner within the furnace. The damper is preferably counterweighted as by a weighted arm 22 secured thereto and projecting above the common axis of the pivots 21. When the damper is closed it assumes a position at an angle to the vertical as indicated by dotted lines in Fig. 5, the bottom edge of the damper then abutting the adjacent end wall 23 of the damper box. Unless force is applied to hold the damper closed it tends to remain open.

Mounted on the damper is a vertical guide 24 for a crank 25 at one end of a crank arm 26 which forms part of a shaft 27. This shaft is connected through a gear train to an electric motor 28 (Fig. 3) supported on a chassis 29. The chassis is secured to one side of the damper box as by a lateral extension 30 which may be bolted or otherwise secured to said side, it being noted that the shaft 27 extends through said extension.

Mounted on chassis 29 are two spring blade switches S1 and S2 (Fig. 3), one at either side of a gear 31 which is secured to the shaft 27 and which forms part of the gear train driven by the motor 28. The contacts for the switches overlie the latter as indicated at S*a* and S*b*. The blades are so tensioned that the switches tend to remain open. Mounted on the shaft 27 for rotation therewith are two cams 32 and 33 for actuating the switches S1 and S2, respectively. In Figs. 3 and 4 the cam 33 is shown as engaging and pushing the switch S2 against its contact S*b*. A coil spring 34 on the shaft 27 will rotate the latter to close the damper when motor 28 is deenergized. The gear train between the shaft 27 and the motor 28 is a free running affair hence the spring 34 in rotating the shaft 27 as said will also cause rotation of the gear train and motor in a damper-opening direction.

Figure 8:
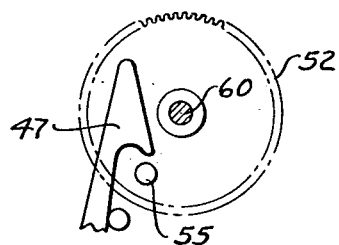

The motor mechanism for the gas valve will next be described. Detachably secured to the valve body 13 is a chassis 40 for supporting the valve operating mechanism. The valve stem is indicated at 41 and is shown as passing through a flexible seal 42. Pivotally mounted on the chassis as at 43 is a valve-operating lever 44 and pivotally mounted on the lever as at 45 is an upstanding link 46 having a hooked upper end as indicated at 47 (see Fig. 8). The lever 44 is pivotally connected as at 48 between the sides of a U-shape member 49 which is movably coupled to the valve stem 41, the latter loosely passing through the bottom of the member and having thereon an adjustable nut 50 between which and another nut 51, also on the valve stem, the said member is free to move. In other words, there is a lost motion connection between the said member 49 and valve stem 41. The purpose of this lost motion connection will more fully appear hereinafter.

Rotatably supported on the chassis 40 is a gear wheel 52 which is the last-driven gear of a gear train, the first gear of which is a pinion 53 secured to the shaft of an electric motor 54. Projecting laterally from one side of the gear 52 is a crank pin 55 for engaging with the hooked end 47 of the link 46 when the motor 54 is energized to open the valve or, in other words, when the gear wheel 52 is rotated in a clockwise direction as viewed in Fig. 8. A spring 56 associated with the lever 44 and link 46 tends to maintain the upper end of the link in a position to be engaged by the crank pin 55.

The gear train between the gear 52 and pinion 53 is a free running affair with the result that unless the motor 54 is positively prevented from rotating in a valve closing direction, as when it is energized, the valve will automatically close due to its being biased towards valve closing position by a spring, not shown, within the valve housing 13. The reverse rotation thus imparted to the gear train will ordinarily carry the crank pin 55 some distance away from the hooked end 47 of the link 46. The lost motion connection between the valve stem and U member 49 and the overrunning arrangement between the crank pin 55 on the gear wheel 52 and the link 46, singly and together, provide a slack coupling between the motor or prime mover 54 and the valve for a purpose hereinafter appearing.

In accordance with the present invention the gear wheel 52 is secured to a shaft 60 supported in appropriate bearings 61 and the shaft is made long enough, as indicated at 60a, to extend a substantial distance beyond one of the bearing-supporting standards 62 and beyond a panel board 63 secured to the standard in spaced relation. Mounted on the shaft extension for rotation therewith is a disk 64 having a radial flange 65 at one side. Turnably mounted on the disk is a switch-operating member 66 of insulating material. This member is frictionally held against the flange 65 by a spring-pressed plate 67 in order to insure that the member will turn with the disk. The degree that the member 66 is free to turn is limited by a stop pin 68, projecting from the standard 62 and extending between two fingers 69 projecting from the top of said member.

Figure 10:
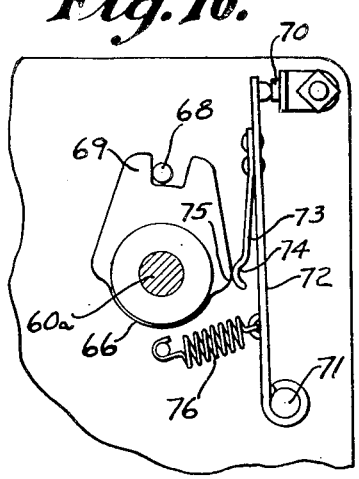

Mounted on the panel board 63 at one side of the member 66 is a fixed electrical contact 70. Pivotally mounted on said board as at 71 is an upstanding switch arm 72. Secured to the switch arm and extending between said arm and the said member 66 is a light leaf spring 73 having a hump 74, this hump being arranged adjacent a wiper hump 75 on the member 66. A light coil spring 76 anchored at one end to the panel board 63 and at its other end to the switch arm tends to pull the latter away from the contact 70 and holds the spring blade 73 in contact with the wiper hump 75 on the member 66. The arrangement is such that when the wiper member 66 is moved towards the right as viewed in Fig. 10, (in a valve opening direction) it will move the switch arm into engagement with its contact 70 against the tension of the coil spring 76.

Referring now to Fig. 11 which shows the wiring diagram for the apparatus: In this diagram the motor 54 of the valve-operating mechanism is assumed to be deenergized since the room thermostat is in a no-call-for-heat position which is equivalent to saying that the fuel valve is closed. In this position the damper motor 28 is energized to hold the damper 20 closed. The circuit for the damper motor 28 is in such case starting and ending with its motor field 28f as follows: wires a, b and c; the secondary T2 of the transformer T; wire d to contact 70; contact 70 and switch arm 72 (for convenience of description these two elements may also be referred to as the "third switch") and the wire e which completes the circuit.

When the damper motor 28 is energized to hold the damper 20 closed, the switch elements S1, Sa (hereinafter also referred to as the "fourth switch") make electrical contact by reason of the cam 32 pressing on the blade S1.

Assume now that the room thermostat Rt calls for heat as it does when its blades R1 and R2 move to the right, as viewed in Fig. 11, into contact with terminals f and h, respectively. (Blade R1 and contact f will hereinafter also be referred to as "first switch" and blade R2 and contact h as "second switch"). The initial circuit for the valve motor 54 is then, starting and ending with its motor field 54f, as follows: wires j and c; the secondary T2 of the transformer T; wire d; switch elements 70, 72; wires e and k; switch elements S1, Sa; wire m; contact f; blade R1 to point n, and wires p and q to the motor field 54f.

The motor 54 upon being energized will continue to rotate until the cam 66 opens its associated switch 72, it being remembered that this opening occurs during the first few degrees of rotation of the shaft 60 in a valve-opening direction, or before all of the slack has been taken up between the crank pin 55 and the valve stem 41. As soon as the switch 72 is opened, the power circuit for the damper motor 28 is opened whereupon the damper 20 immediately moves to open position under the influence of the spring 34 on the shaft 27. As the shaft 27 turns to damper-open position the cam 33 on said shaft closes the switch S2 (hereinafter also referred to as the "fifth switch") and the cam 32 opens the switch S1.

The damper motor 28 having been deenergized to permit the damper to open, the valve motor 54 is again energized to permit it to open the fuel valve, the new circuit, starting with the motor field 54f, being as follows: wires j and c; secondary T2 of the transformer T; wire s, switch elements S2, Sb; wire t to the thermostat terminal h; blade R1 to point n, and wires p and q to the motor field 54f. The motor 54 after having opened the fuel valve is allowed in accordance with the present circuit, to remain energized to hold the valve open until the thermostat Rt moves to no-call-for-heat position.

While not shown in the diagram, a switch under the control of a pilot thermostat will be provided at some appropriate point as at x to prevent the motor 54 from being energized unless the pilot is burning.

What I claim is:

1. In a control system for a furnace having a damper in its exhaust flue and a fuel control valve, the combination of five switches, a thermostat comprising the first and second of said switches both of which are closed when the thermostat calls for heat, a mechanism for operating said valve and comprising the third of said switches and a motor for operating said mechanism in a valve-opening direction, said third switch being closed by said mechanism on initial movement of the latter in a valve-closing direction and being opened by said mechanism on initial movement of the latter in a valve-opening direction, a mechanism for operating said damper and comprising the fourth and fifth of said switches and a motor for operating the mechanism in a damper-closing direction, the fourth of said switches being closed when the damper is closed and the fifth of said switches being closed when the damper is open, a circuit comprising the third of said switches and being active to energize the motor of the damper-operating mechanism when the said third switch is closed, a circuit comprising the first, third and fourth of said switches and being active to energize the motor of the valve-operating mechanism when the said first, third and fourth switches are closed, and a circuit comprising the second and fifth of said switches and being active to energize the motor of the valve-operating mechanism when said second and fifth switches are closed.

2. In a control system for a furnace having a damper in its exhaust flue and a fuel control valve, the combination of mechanism for operating said valve, a switch associated with said mechanism and operated by the latter to closed position on initial movement of the mechanism in a valve-closing direction and operated by the mechanism to open position on initial movement of the mechanism in a valve-opening direction, means including a motor for closing said damper when the motor is energized, and a circuit comprising said switch for energizing said motor when said switch is closed.

3. In the combination specified in claim 2, the said mechanism comprising a free-running gear train and a motor for operating the latter in a valve-opening direction.

4. In a control system for a furnace having a damper in its exhaust flue biased towards open position and a fuel control valve, the combination of a power-operated device associated with said damper and normally energized to hold the damper closed while the fuel valve is closed, a prime mover for opening the valve, a coupling connecting the prime mover and valve in a manner to provide a limited degree of slack therebetween, a master controller for energizing the prime mover, and means operable while the prime mover is taking up the slack between it and the valve for deenergizing the said power-operated device whereby the damper may open before the valve is opened by the prime mover.

5. In a control system for a furnace having a damper in its exhaust flue and a fuel-supply device, in combination, movable means for actuating the fuel-supply device, means for opening the damper operated by initial movement of the movable means, and means for rendering the movable means inoperative during intermediate movement of the damper.

6. In a control system for a furnace having an exhaust flue and a fuel-supply device, in combination, a damper in the exhaust flue biased toward open position, means for actuating the fuel-supply device, means for releasing the damper operated by the device-actuating means, and means for rendering the device-actuating means operative while the damper is in closed and opened positions and inoperative while the damper is in intermediate positions.

7. In a control system for a furnace having a damper in its exhaust flue and a fuel-supply device, in combination, means for actuating the fuel-supply device, means for opening the damper operated by the device-actuating means, means for rendering the device-actuating means operative while the damper is closed, means for rendering the device-actuating means inoperative upon operation of the damper-opening means, and means actuated when the damper is fully open for rendering the device-actuating means again operative.

NELSON T. BRANCHE.